United States Patent [19]

Fukunaga et al.

[11] Patent Number: 5,703,860
[45] Date of Patent: Dec. 30, 1997

[54] OPTICAL IMAGING RECORDING SYSTEM FOR PERFORMING IMAGE RECORDING BY FOCUSING MODULATED LIGHT BEAMS

[75] Inventors: Hideki Fukunaga; Shoji Yamaguchi; Takashi Nomiyama, all of Nakai-machi, Japan

[73] Assignee: Fuji Xerox Co., Ltd., Tokyo, Japan

[21] Appl. No.: 745,326

[22] Filed: Nov. 8, 1996

[30] Foreign Application Priority Data

Dec. 28, 1995 [JP] Japan .................. 7-344029

[51] Int. Cl.⁶ ................. G03G 15/04; G11B 7/00
[52] U.S. Cl. ............... 369/102; 369/119; 369/121; 369/44.37; 347/242
[58] Field of Search .................... 369/112, 102, 369/119, 121, 122, 44.37; 358/494, 302; 235/462, 467; 347/240, 258, 242, 251, 255

[56] References Cited

U.S. PATENT DOCUMENTS

| | | | |
|---|---|---|---|
| 4,476,474 | 10/1984 | Kitamura | 347/240 |
| 4,506,275 | 3/1985 | Maeda | 347/251 |
| 4,520,472 | 5/1985 | Reno | 369/112 |
| 4,818,886 | 4/1989 | Drucker | 235/462 |
| 5,122,658 | 6/1992 | Ando | 358/494 |

FOREIGN PATENT DOCUMENTS

| | | |
|---|---|---|
| A-1-152683 | 6/1989 | Japan . |
| A-2-140710 | 5/1990 | Japan . |
| A-2-289812 | 11/1990 | Japan . |
| A-5-294005 | 11/1993 | Japan . |

Primary Examiner—David C. Nelms
Assistant Examiner—Kim-Kwok Chu
Attorney, Agent, or Firm—Oliff & Berridge

[57] ABSTRACT

An optical beam recording device for performing image recording by focusing a plurality of light beams modulated according to an image signal through a focusing optical system onto a photosensitive member, including a light source having a plurality of arrayed light emitting portions for emitting the plurality of light beams; a light detecting device located at a given position for detecting a detecting light beam of the plurality of light beams; and a control device for controlling a focused condition of the plurality of light beams on the photosensitive drum according to a result of detection of the detecting light beam by the light detecting device. With this arrangement, shift of a focal position can be detected with high accuracy without increasing a response speed of the light detecting device and inviting the complication of configuration.

16 Claims, 10 Drawing Sheets

5,703,860

OPTICAL IMAGING RECORDING SYSTEM FOR PERFORMING IMAGE RECORDING BY FOCUSING MODULATED LIGHT BEAMS

BACKGROUND OF THE INVENTION

1. Field of the Invention

The present invention relates to an optical beam recording device, and more particularly to an optical beam recording device which can detect shift of a focal position of a light beam due to temperature changes, external vibrations, etc. without increasing a detection response speed.

2. Description of the Related Art

In recent years, there has been demanded improvement in image quality of an optical beam recording device such as a laser beam printer and a digital copier. To meet this demand, repeated attempts have been made to improve the accuracy of a recording image and thereby realize high-resolution image recording. To this end, it is necessary to maintain the size of each recording pixel less than or equal to a given value by controlling a focal position of a light beam with high accuracy.

A conventional optical beam recording device having an optical beam focal position detecting device is disclosed in Japanese Unexamined Patent Application No. 2-140710, for example. The optical beam focal position detecting device described in this publication includes a photodetector located just before a nonimage forming region of a photosensitive member and a slit plate provided at an opening of a housing accommodating the photodetector. The slit plate has a plurality of slits regularly arranged in a horizontal scanning direction of a light beam. In this optical beam focal position detecting device, when the light beam converged by a collimator lens scans the photosensitive member in the horizontal scanning direction, the light beam is passed through the slits of the slit plate and detected by the photodetector in the case that the beam size of the light beam is less than or equal to a given value. As a result, independent pulses whose number is equal to the number of the slits are output from the photodetector. On the other hand, if the beam size is larger than the given value, a continuous waveform signal rather than independent pulses is output from the photodetector. Accordingly, shift of the focal position of the light beam is detected according to the output from the photodetector, and is corrected for by displacing the collimator lens along the optical axis of the light beam.

A modification of this optical beam focal position detecting device is also described in Japanese Unexamined Patent Application No. 2-140710 mentioned above. This modification includes a photodetector for detecting a light beam passed through a single slit formed through a slit plate. According to this modification, the shift of the focal position is corrected for by displacing the collimator lens along the optical axis according to a detection level by the photodetector changing according to the beam size of the light beam.

Another conventional optical beam recording device having an optical beam focal position detecting device is disclosed in Japanese Unexamined Patent Application No. 2-289812, for example. The optical beam focal position detecting device described in this publication includes an autofocus pattern having recessed portions and nonrecessed portions arranged regularly in a nonimage forming region of a photosensitive member, and a photodetector for detecting a light beam reflected from the recessed portions and the nonrecessed portions through a focusing lens. According to this optical beam focal position detecting device, when a difference in detection level by the photodetector between the reflected light from the recessed portions and the reflected light from the nonrecessed portions becomes less than a given value, it is determined that shift of the focal position has occurred. Then, a collimator lens is displaced along the optical axis according to the difference to thereby correct for the shift of the focal position.

However, in the conventional optical beam focal position detecting device described in Japanese Unexamined Patent Application No. 2-140710, the scanning speed of the light beam in the horizontal scanning direction is on the order of 1 μm/ns, and the response speed of the photodetector is relatively low such as ten nanoseconds to tens of nanoseconds. Therefore, when the beam size of the light beam is set to 20 μm or less, the photodetector cannot accurately measure the beam size on the order of micrometers.

On the other hand, in the conventional optical beam focal position detecting device described in Japanese Unexamined Patent Application No. 2-289812, the autofocus pattern must be formed on the photosensitive drum, so that a manufacturing step is increased to cause an increase in cost.

SUMMARY OF THE INVENTION

It is accordingly an object of the present invention to provide an optical beam recording device which can detect shift of a focal position with high accuracy without increasing a response speed of a photodetector and inviting the complication of configuration.

It is another object of the present invention to provide an optical beam recording device which can accurately detect the shift of the focal position due to temperature changes, external vibrations, etc.

It is a further object of the present invention to provide an optical beam recording device which can detect the shift of the focal position without the need for formation of an autofocus pattern or the like on a photosensitive drum.

According to the present invention, there is provided an optical beam recording device for performing image recording by focusing a plurality of light beams modulated according to an image signal through a focusing optical system onto a photosensitive member, comprising a light source having a plurality of arrayed light emitting portions for emitting the plurality of light beams; light detecting means located at a given position for detecting a detecting light beam of the plurality of light beams; and control means for controlling a focused condition of the plurality of light beams on the photosensitive drum according to a result of detection of the detecting light beam by the light detecting means.

Other objects and features of the invention will be more fully understood from the following detailed description and appended claims when taken with the accompanying drawings.

DETAILED DESCRIPTION OF THE PREFERRED EMBODIMENTS

Figure 1:
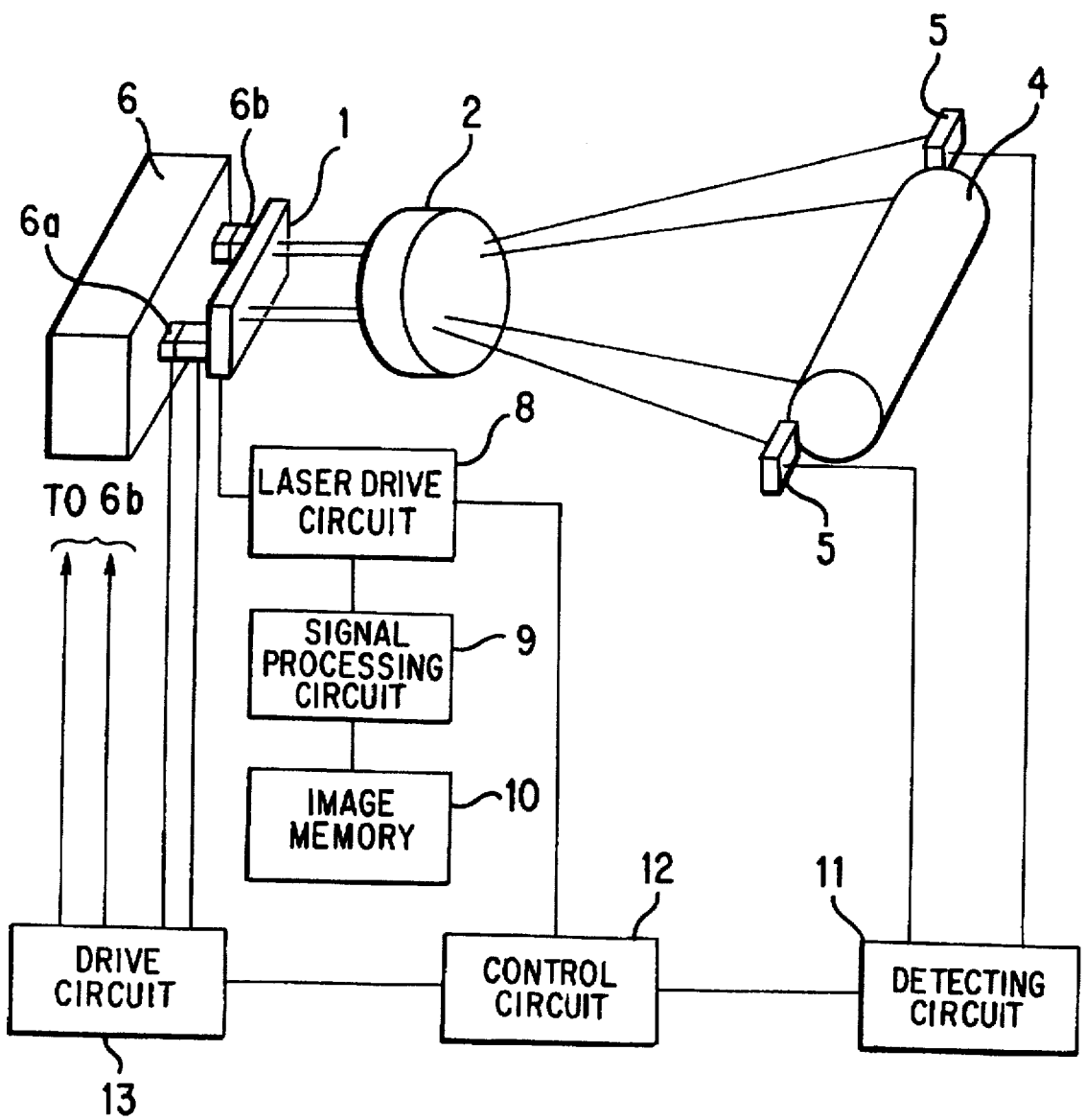
FIG. 1 is an illustration of an optical beam recording device according to a first preferred embodiment of the present invention.

FIG. 1 shows an optical beam recording device according to a first preferred embodiment of the present invention. The optical beam recording device includes a semiconductor laser array 1 for emitting a plurality of laser beams simultaneously and independently, a pair of piezoelectric elements 6a and 6b for advancing and retracting the semiconductor laser array 1 along an optical axis with respect to a fixed stage 6, an image memory 10 storing an image signal, a signal processing circuit 9 for processing the image signal to output a recording signal corresponding to a recording pattern, a laser drive circuit 8 for inputting the recording signal to drive the semiconductor laser array 1, a focusing optical system 2 for focusing the laser beams emitted from the semiconductor layer array 1 to a given position, a photosensitive drum 4 rotatably supported by a support roll (not shown) and adapted to be exposed to the laser beams to thereby form an electrostatic latent image, two photodetectors 5 provided on the opposite sides of the photosensitive drum 4 and adapted to be exposed to two of the laser beams, for generating electrical signals corresponding to light intensities of the laser beams received, a detecting circuit 11 for detecting the size of a beam spot of each laser beam according to the electrical signals from the photodetectors 5, a control circuit 12 for outputting a control signal according to data from the detecting circuit 11, and a drive circuit 13 for driving the piezoelectric elements 6a and 6b according to the control signal. Although not shown, the recording device is provided with a developing unit for developing the electrostatic latent image formed on the photosensitive drum 4 to form a toner image, a transferring unit for transferring the toner image onto a recording medium, and a fixing unit for fixing the toner image on the recording medium.

Figure 2:
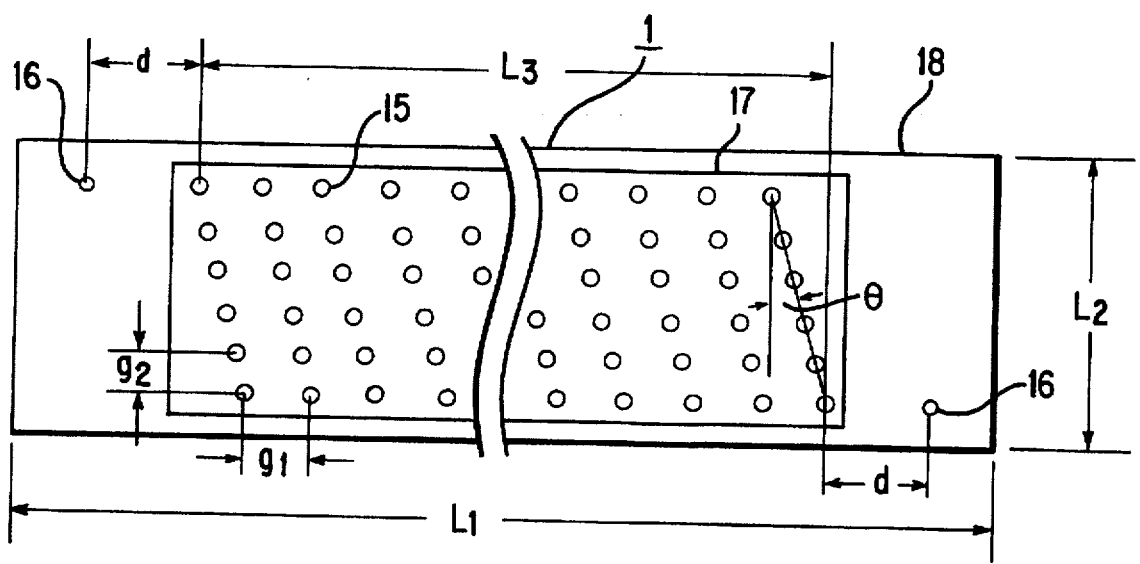
FIG. 2 is an illustration of a two-dimensional surface-emitting laser array in the first preferred embodiment of the present invention.

FIG. 2 shows the semiconductor laser array 1 shown in FIG. 1. The semiconductor laser array 1 is constructed of two-dimensional surface-emitting lasers. Preferably, the semiconductor laser array 1 includes a single semiconductor substrate 18, a recording region 17 formed on the semiconductor substrate 18 in which region 17 a plurality of image writing light emitting portions 15 are arranged two-dimensionally, and two detecting light emitting portions 16 arranged diagonally in a region outside of the recording region 17. This region in which the detecting light emitting portions 16 are formed will be hereinafter referred to as a detecting region. In the following description, it is assumed that the light emitting portions 15 and 16 include the lasers for emitting the laser beams. The image writing light emitting portions 15 are arranged in parallel in a horizontal scanning direction and obliquely at an angle of inclination, θ, in a vertical scanning direction. The light emitting portions 16 are equally spaced from each other a distance $g_1$ in the horizontal scanning direction and a distance $g_2$ in the vertical scanning direction. The semiconductor substrate 18 has a size of $L_1 \times L_2$, and the distance between the outermost ones of the light emitting portions 15 in the horizontal scanning direction is set to $L_3$, which is substantially equal to the width of the recording region 17. On the other hand, the detecting light emitting portions 16 are arranged so that each light emitting portion 16 is spaced a distance d from the adjacent light emitting portion 15 in the horizontal scanning direction.

Figure 3A:
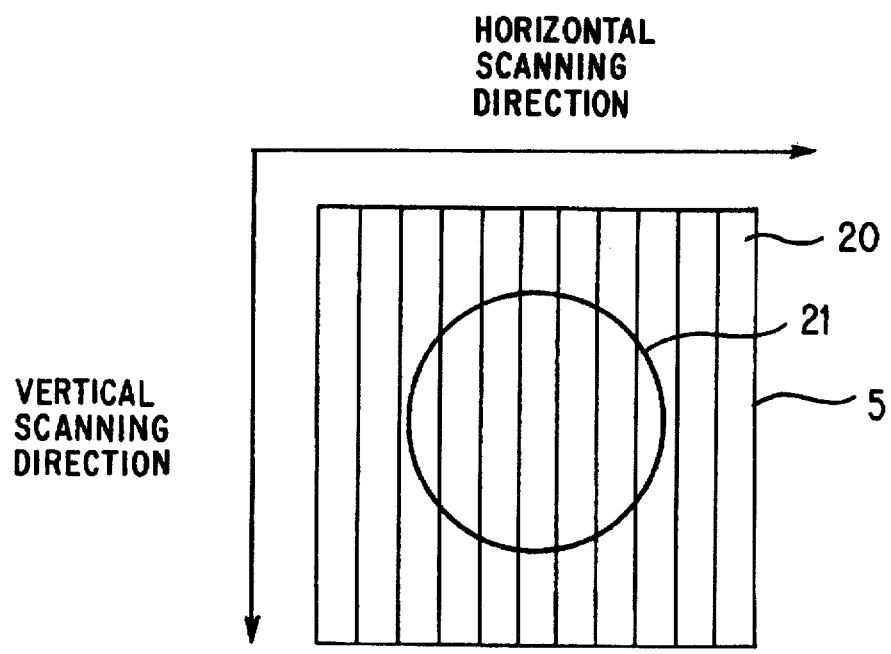
FIG. 3A is an illustration of the relation between a photodetector and a spot size of a laser beam in the first preferred embodiment of the present invention.
Figure 3B:
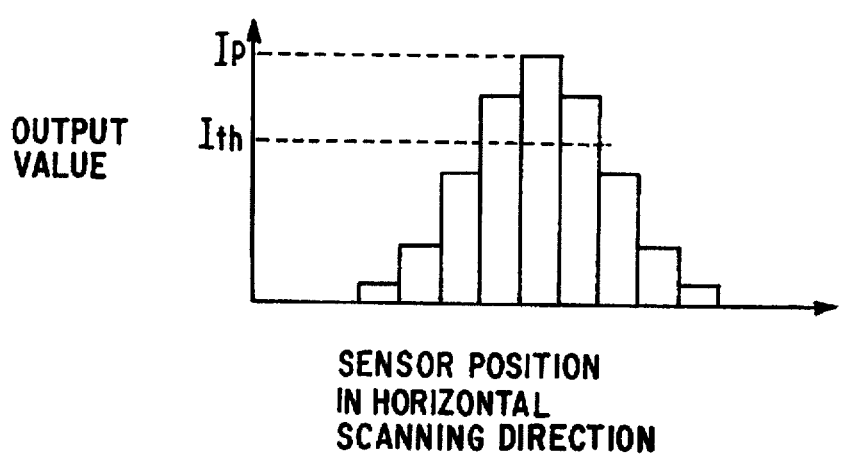
FIG. 3B is a graph showing an output from the photodetector shown in FIG. 3A.

FIG. 3A shows the configuration of a plurality of opto-electric conversion segments 20 forming each photodetector 5 shown in FIG. 1. The plural opto-electric conversion segments 20 each extending like a strip in the vertical scanning direction are juxtaposed in the horizontal scanning direction. When the laser beam is directed onto each photodetector 5 to form a beam spot 21 as shown in FIG. 3A, each opto-electric conversion segment 20 outputs an electrical signal corresponding to the light intensity detected as shown in FIG. 3B.

It is known that the piezoelectric elements 6a and 6b shown in FIG. 1 can generate high-rigidity displacements at low voltages. For example, the piezoelectric elements having the following specifications shown in Table may be used as the piezoelectric elements 6a and 6b.

TABLE

| Type | A | B | C | D |
| --- | --- | --- | --- | --- |
| Number of Stacked Elements | 360 | 200 | 200 | 150 |
| Thickness of Each Stacked Element (mm) | 0.29 | 0.29 | 0.18 | 0.11 |
| Total Length (mm) | 109 | 64 | 41 | 21 |
| Length of Stacked Elements (mm) | 105 | 60 | 37 | 17 |
| Longer Side of Rectangle (mm) | 8.0 | 5.2 | 5.2 | 5.2 |
| Shorter Side of Rectangle (mm) | 8.0 | 4.5 | 4.5 | 4.5 |
| Capacitance (nF) | 2350 | 500 | 600 | 900 |
| Maximum Rated Drive Voltage (V) | 300 | 300 | 250 | 150 |
| Rated Displacement (μm) | 98 | 57 | 42 | 20 |
| Displacement Per Unit Drive Voltage (μm/V) | 0.32 | 0.18 | 0.16 | 0.13 |
| Output Force (N) | 4000 | 1300 | 1200 | 700 |

The operation of the optical beam recording device in the first preferred embodiment will now be described.

The image signal stored in the image memory 10 is read out and processed by the signal processing circuit 9 according to a recording pattern. The image signal is next input as a recording signal into the laser drive circuit 8. The image writing light emitting portions 15 formed in the recording region 17 of the semiconductor laser array 1 are independently intensity-modulated by the laser drive circuit 8 to emit a plurality of laser beams having image information. The laser beams are focused on the photosensitive drum 4 rotating at a given speed by the focusing optical system 2, according to a zoom ratio at which the width $L_3$ of the recording region 17 of the semiconductor laser array 1 is reduced, enlarged, or equalized to the width of an image writing region on the photodetector drum 4, thereby forming an electrostatic latent image in the image writing region on the photosensitive drum 4.

Simultaneously, a drive signal is input into the laser drive circuit 8 by a signal from the control circuit 12, and the detecting light emitting portions 16 are independently driven by the laser drive circuit 8. The laser beams emitted from the two detecting light emitting portions 16 are passed through the focusing optical system 2 and next directed onto the two photodetectors 5 to form two beam spots 21 on the two photodetectors 5, respectively. When the beam spot 21 is thus formed on each photodetector 5, the opto-electric conversion segments 20 of each photodetector 5 independently output to the detecting circuit 11 electrical signals corresponding to the light intensities detected. The detecting circuit 11 detects the size of each beam spot 21 in the horizontal scanning direction, and outputs data of the spot size to the control circuit 12. When the spot size falls outside a given range, a drive signal is generated from the control circuit 12 to the drive circuit 13 according to the data of the spot size, and the piezoelectric elements 6a and 6b are operated by the drive circuit 13 to move the semiconductor laser array 1 at its opposite end portions along the optical axis of each laser beam, that is, advance or retract the semiconductor laser array 1 toward or away from the focusing optical system 2, thereby automatically adjusting a focal position. Accordingly, the spot size is controlled to fall within the given range.

Figure 4:
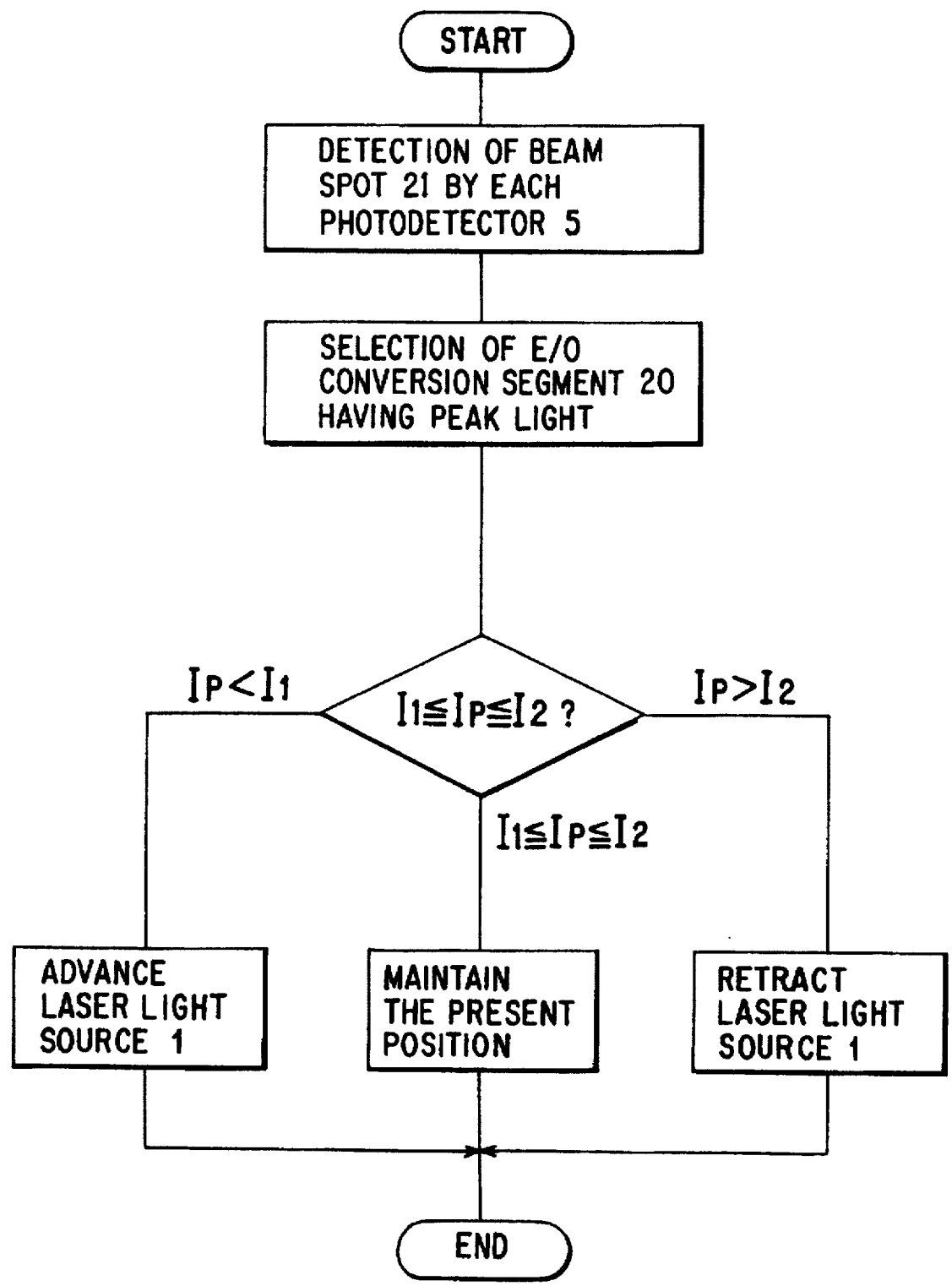
FIG. 4 is a flowchart showing control in the first preferred embodiment of the present invention.

FIG. 4 shows a control flow of detecting the spot size of the beam spot 21 on each photodetector 5 and moving the semiconductor laser array 1 along the optical axis of each laser beam. First, each photodetector 5 detects the laser beam emitted from the corresponding detecting light emitting portion 16. Then, the detecting circuit 11 inputs light intensity signals from the opto-electric conversion segments 20 of each photodetector 5, and selects one of the opto-electric conversion segments 20 having a maximum light intensity, i.e., a peak light intensity Ip. Then, the detecting circuit 11 outputs the peak light intensity Ip to the control circuit 12. The control circuit 12 compares the peak light intensity Ip with an upper limit light intensity $I_2$ and a lower limit light intensity $I_1$ to perform the following control.

(1) $I_1 \leq Ip \leq I_2$

In this case, the control circuit 12 determines that the laser beams emitted from the image writing light emitting portions 15 are focused on the photosensitive drum 4 without shifting of a focal position. Accordingly, the control circuit 12 outputs a control signal indicating a first condition to the drive circuit 13 to maintain a present strain condition of the piezoelectric elements 6a and 6b. Therefore, the semiconductor laser array 1 is maintained at a present position.

(2) $Ip > I_2$

In this case, the control circuit 12 determines that the spot size of each beam spot formed on the photosensitive drum 4 is larger than an upper limit spot size. Accordingly, the control circuit 12 outputs a control signal indicating a second condition to the drive circuit 13, and the drive circuit 13 outputs drive signals to the piezoelectric elements 6a and 6b to thereby retract the semiconductor laser array 1.

(3) $Ip < I_1$

In this case, the control circuit 12 determines that the spot size of each beam spot formed on the photosensitive drum 4 is smaller than a lower limit spot size. Accordingly, the control circuit 12 outputs a control signal indicating a third condition to the drive circuit 13, and the drive circuit 13 outputs drive signals to the piezoelectric elements 6a and 6b to thereby advance the semiconductor laser array 1.

In the first preferred embodiment mentioned above, the position of each photodetector 5 on the optical axis of the corresponding laser beam is preferably set to a position such that even when the focal position of the laser beam is displaced, each photodetector 5 can always detect either a convergent beam or a divergent beam, and that the position is as near as to the focal position. In other words, the preferable position is a position as near as to the focal position such that the laser beam being detected by each photodetector 5 is not changed from a divergent beam to a convergent beam or from a convergent beam to a divergent beam by the displacement of the focal position of the laser beam. By setting each photodetector 5 in such a position, the amount and direction of movement of the semiconductor laser array 1 can be simultaneously computed by only detecting the spot size of the beam spot 21 on each photodetector 5.

In the case that each photodetector 5 is located so that when the laser beam from each image writing light emitting portion 15 has a focal point on the photosensitive drum 4, the laser beam from each detecting light emitting portion 16 has a focal point on the corresponding photodetector 5, the spot size of the beam spot 21 detected by each photodetector 5 may be stored into a memory. In this case, a direction of shifting of the focal position can be determined by comparing spot sizes before and after adjustment on the basis of the stored spot size.

The amount of movement of the semiconductor laser array 1 is determined by the amounts of displacement of the piezoelectric elements 6a and 6b provided at the opposite end portions of the semiconductor laser array 1. That is, the amounts of movement of the opposite end portions of the semiconductor laser array 1 becomes equal to each other or different from each other, depending upon the amounts of displacement of the piezoelectric elements 6a and 6b. In any case, the amount of movement of the semiconductor laser array 1 at each end portion is determined by a result of detection of the corresponding photodetector 5.

Although partially repeatedly described, it is sufficient to perform initialization so that when the spot size of the beam spot 21 of the laser beam emitted from each detecting light emitting portion 16 formed at both end portions of the semiconductor laser array 1 is a given size, the focal position of the laser beam emitted from each image writing light emitting portion 15 falls on the photosensitive drum 4. Accordingly, by adjusting the position of the semiconductor laser array 1 so that the focal point of the laser beam from each detecting light emitting portion 16 at both end portions of the semiconductor laser array 1 falls at a given position, the focal position of the laser beam from each image writing light emitting portion 15 formed in the recording region 17 between the two detecting light emitting portions 16 can be adjusted. Since the detecting light emitting portions 16 are driven independently of the image writing light emitting portions 15 in the recording region 17, the adjustment of the focal position of the laser beam from each image writing light emitting portion 15 can be performed at an arbitrary time. Each photodetector 5 is formed by the plural optoelectric conversion segments 20 each extending like a strip in the vertical scanning direction and juxtaposed in the horizontal scanning direction. Accordingly, if there occurs position shift of each component in the vertical scanning direction and/or the horizontal scanning direction, the center position of the beam spot 21 on each photodetector 5 is moved. To cope with this, it is sufficient to set the opto-electric conversion segment 20 detecting the highest light intensity to the center position of the beam spot 21. Accordingly, variations in the spot size due to shifting of the focal position can be detected independently of shifting of the position of each component in the vertical scanning direction and/or the horizontal scanning direction.

Figure 5:
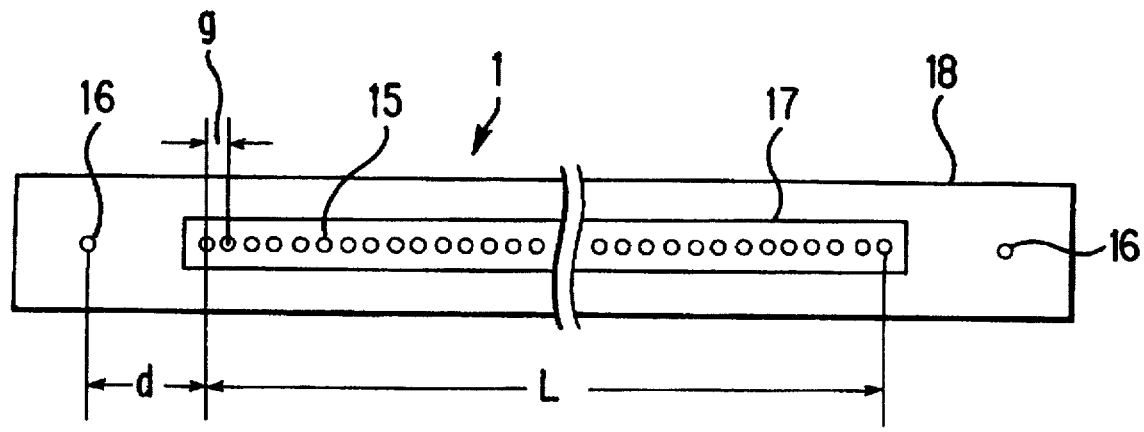
FIG. 5 is an illustration of a one-dimensional surface-emitting laser array in the first preferred embodiment of the present invention.

FIG. 5 shows a modification of the semiconductor laser array 1 applicable to the optical beam recording device in the first preferred embodiment of the present invention. In FIG. 5, the same reference numerals as those shown in FIG. 2 denote the same parts, and the description thereof will be omitted herein to avoid repetition. In this modification, the distance between the outermost ones of image writing light emitting portions 15 formed in a recording region 17 is set to L, which is substantially equal to the width of the recording region 17. The image writing light emitting portions 15 are linearly arranged and equally spaced from each other a distance g. Two detecting light emitting portions 16 are located on the opposite sides of the recording region 17 in such a manner that each detecting light emitting portion 16 is spaced a distance d from the adjacent image writing light emitting portion 15.

Figure 6A:
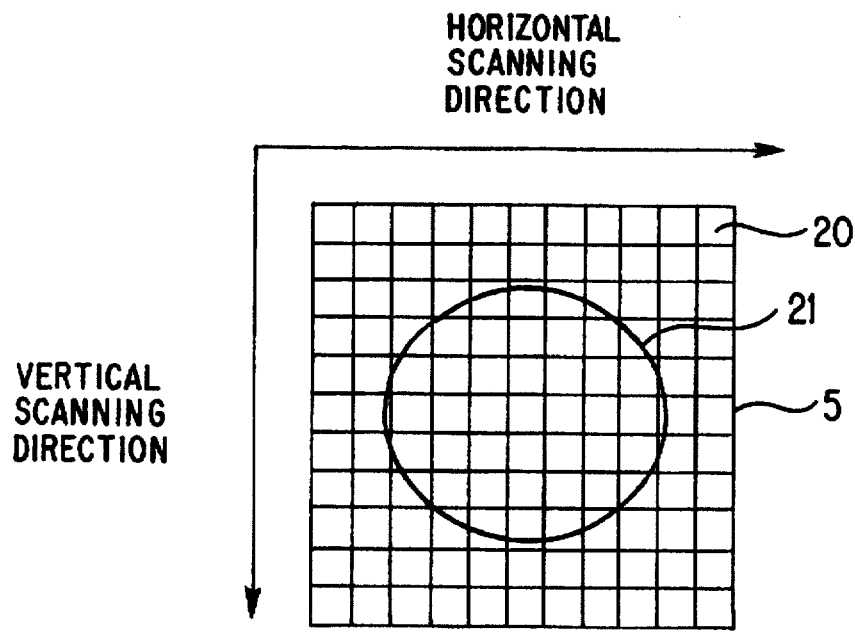
FIG. 6A is an illustration of the relation between another photodetector and a spot size of a laser beam in the first preferred embodiment of the present invention.
Figure 6B:
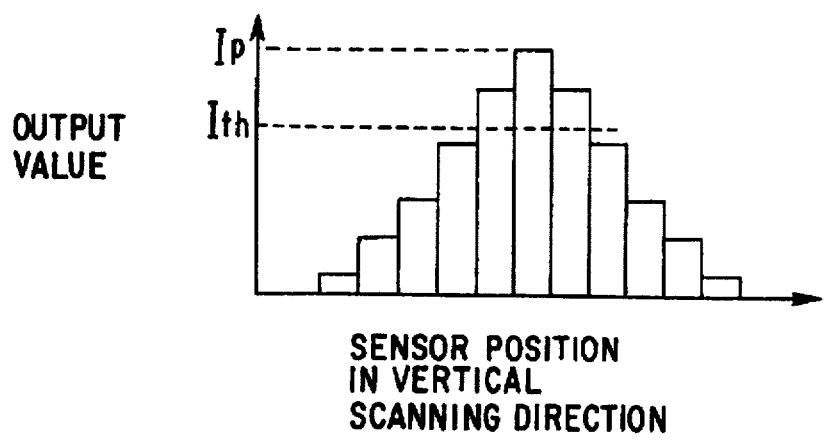
FIG. 6B is a graph showing an output from the photodetector shown in FIG. 6A in a horizontal scanning direction.
Figure 6C:
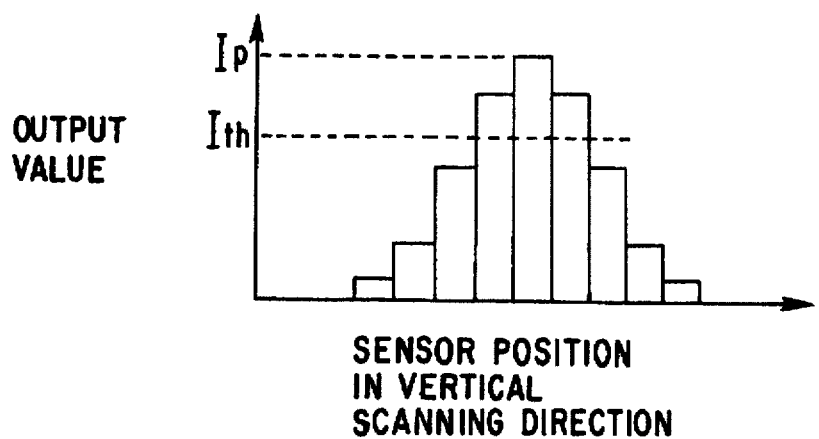
FIG. 6C is a graph showing an output from the photodetector shown in FIG. 6A in a vertical scanning direction.

FIGS. 6A, 6B, and 6C show a modification of each photodetector 5 applicable to the optical beam recording device in the first preferred embodiment of the present invention. In FIGS. 6A to 6C, the same reference numerals as those shown in FIGS. 3A and 3B denote the same parts, and the description thereof will be omitted herein to avoid repetition. In this modification, a plurality of opto-electric conversion segments 20 are two-dimensionally arranged. The opto-electric conversion segments 20 independently supply light intensity signals to respective detecting portions of the detecting circuit 11. The detecting circuit 11 detects a peak light intensity Ip from the light intensity signals, and the control circuit 12 performs control on the movement of the semiconductor laser array 1 on the basis of the flowchart shown in FIG. 4.

In place of the movement control of the semiconductor laser array 1 according to the level of the peak light intensity Ip in the preferred embodiments shown in FIGS. 4A and 4B and FIGS. 6A to 6C, the movement control of the semiconductor laser array 1 may be performed by providing a threshold light intensity $I_{th}$ and detecting the number of opto-electric conversion segments 20 outputting light intensity signals of levels higher than the threshold light intensity $I_{th}$ to advance or retract the semiconductor laser array 1 according to the detected number of opto-electric conversion segments 20.

Figure 7:
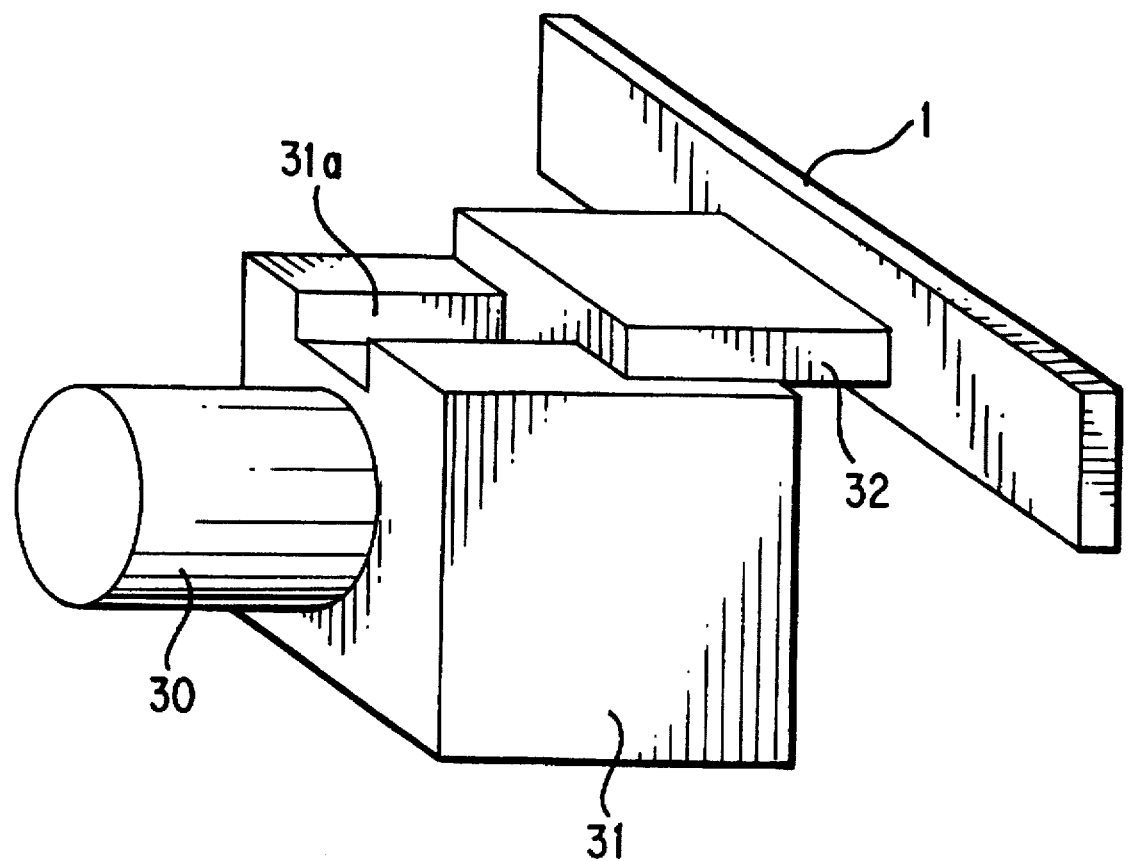
FIG. 7 is a perspective view showing a modification of a moving unit in the first preferred embodiment of the present invention.

FIG. 7 shows a displacing unit applicable to the optical beam recording device in the first preferred embodiment, in place of the piezoelectric elements 6a and 6b shown in FIG. 1. The displacing unit includes a motor 30 to be driven by a drive signal from the drive circuit 13, and a movable stage 32 engaged with a groove 31a of a fixed stage 31 and adapted to be advanced and retracted according to directions of running of the motor 30. The semiconductor laser array 1 is fixed to the movable stage 32.

In operation, the movable stage 32 is advanced or retracted according to normal running or reverse running of the motor 30, thereby advancing or retracting the semiconductor laser array 1.

Figure 8:
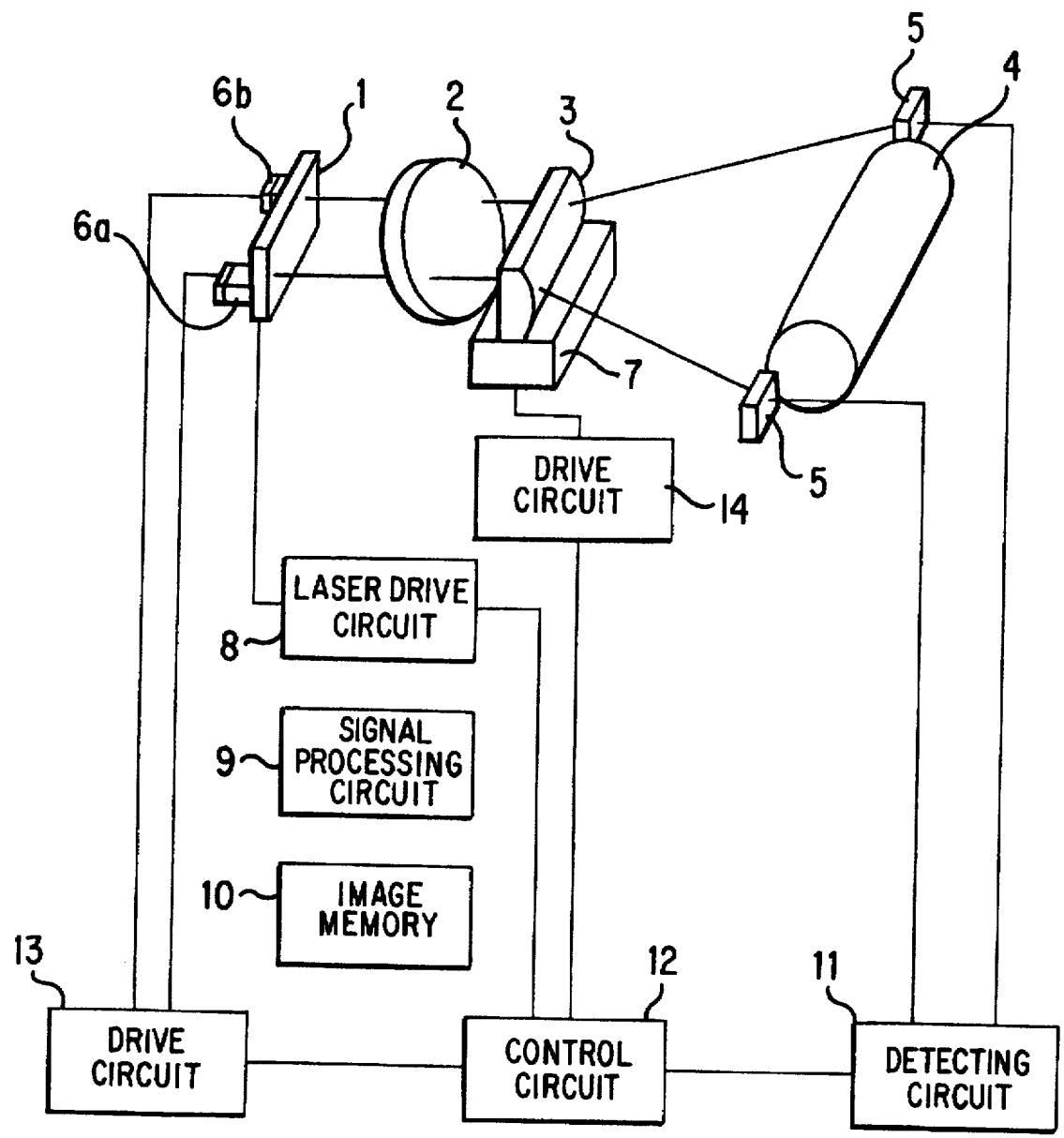
FIG. 8 is an illustration of an optical beam recording device according to a second preferred embodiment of the present invention.

FIG. 8 shows an optical beam recording device according to a second preferred embodiment of the present invention. In FIG. 8, the same reference numerals as those shown in FIG. 1 denote the same parts, and the description thereof will be omitted herein to avoid repetition. In addition to the components shown in FIG. 1, the optical beam recording device shown in FIG. 8 further includes an anamorphic optical system 3 having power in the vertical scanning direction only, a moving unit 7 for moving the anamorphic optical system 3 toward and away from a photosensitive drum 4, and a drive circuit 14 for driving the moving unit 7.

In the second preferred embodiment, not only the spot size in the horizontal scanning direction, but also the spot size in the vertical scanning direction is detected independently of each other. The position of the semiconductor laser array 1 is first adjusted according to data of the spot size in the horizontal scanning direction, and the anamorphic optical system 3 is next moved according to data of the spot size in the vertical scanning direction, thereby automatically adjusting a focal position. The data of the spot size in the vertical scanning direction may be obtained, for example, according to the number of opto-electric conversion segments 20 outputting light intensity signals of levels higher than the threshold light intensity Ith as shown in FIGS. 6A and 6C.

Figure 9:
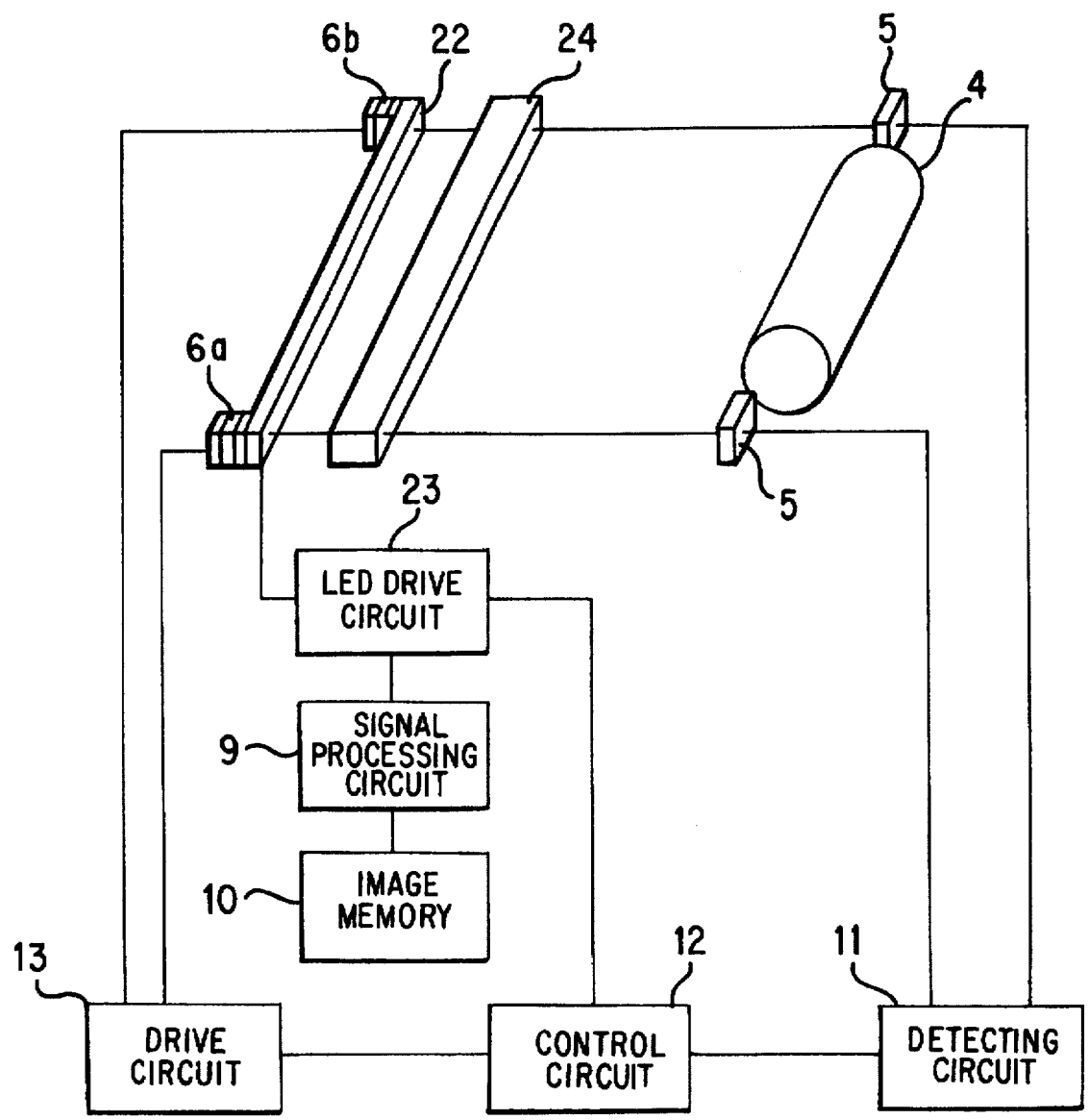
FIG. 9 is an illustration of an optical beam recording device according to a third preferred embodiment of the present invention.

FIG. 9 shows an optical beam recording device according to a third preferred embodiment of the present invention. In FIG. 9, the same reference numerals as those shown in FIGS. 1 and 8 denote the same parts, and the description thereof will be omitted herein to avoid repetition. In this preferred embodiment, an LED array 22 for emitting light beams is used in place of the semiconductor laser array 1; an LED drive circuit 23 for driving the LED array 22 is used in place of the laser drive circuit 8; and a SELFOC lens array 24 for focusing the light emitted from the LED array 22 to a given position is used in place of the focusing optical system 2.

Figure 10:
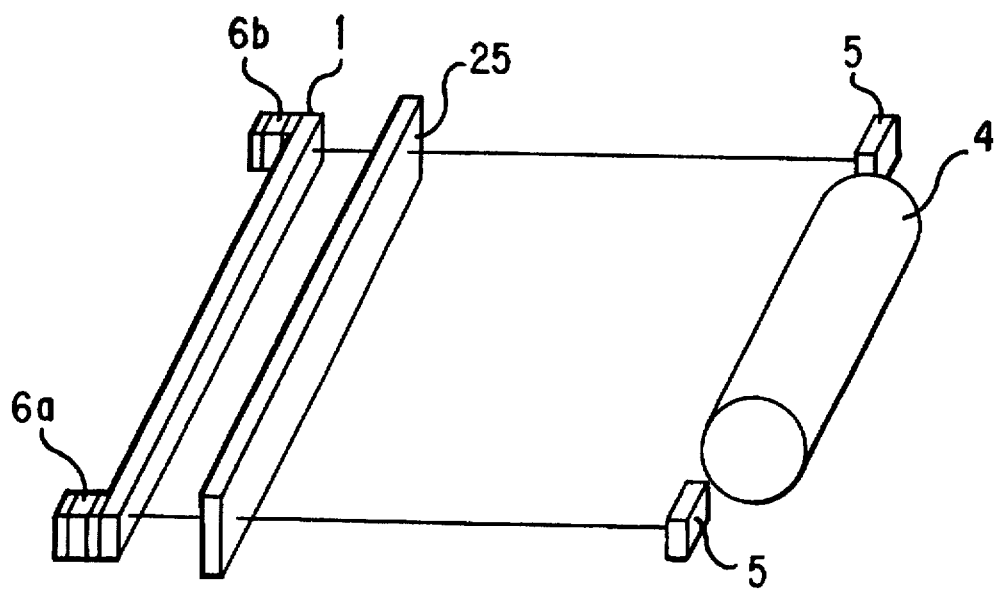
FIG. 10 is an illustration of an optical beam recording device according to a fourth preferred embodiment of the present invention.

FIG. 10 shows an optical beam recording device according to a fourth preferred embodiment of the present invention. In FIG. 10, the same reference numerals as those shown in FIGS. 1, 8, and 9 denote the same parts, and the description thereof will be omitted herein to avoid repetition. In this preferred embodiment, a microlens array 25 is used in place of the focusing optical system 2. The microlens array 25 has a plurality of microlenses (not shown) having an image forming function, respectively corresponding to the light emitting portions of the semiconductor laser array 1.

Figure 11:
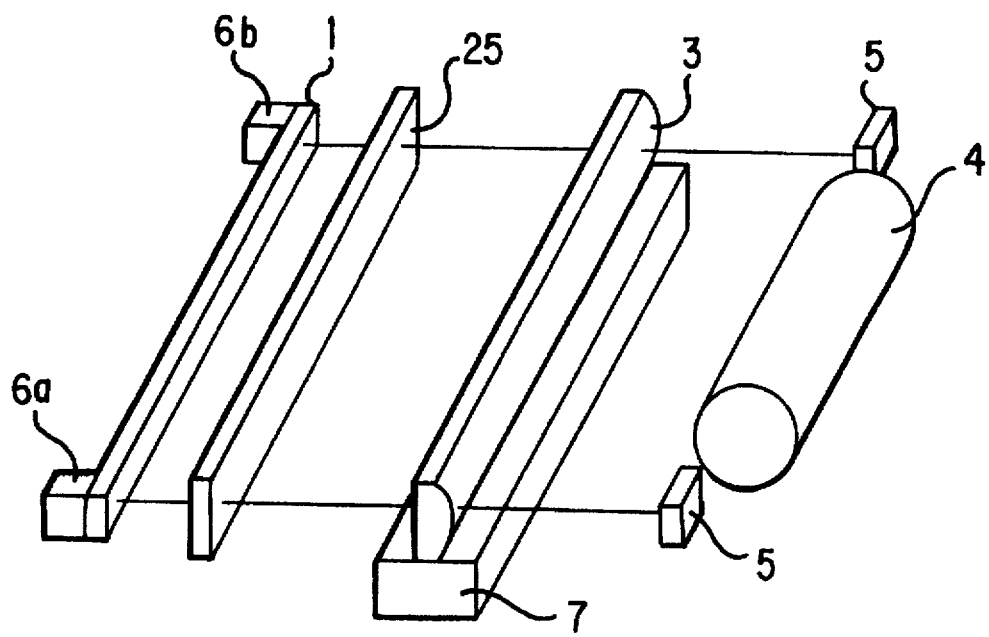
FIG. 11 is an illustration of an optical beam recording device according to a fifth preferred embodiment of the present invention.

FIG. 11 shows an optical beam recording device according to a fifth preferred embodiment of the present invention. In FIG. 11, the same reference numerals as those shown in FIGS. 1, 8, 9, and 10 denote the same parts, and the description thereof will be omitted herein to avoid repetition. In addition to the components shown in FIG. 10, the optical beam recording device shown in FIG. 11 further includes an anamorphic optical system 3 having power in the vertical scanning direction only and a moving unit 7 for moving the anamorphic optical system 3 toward and away from a photosensitive drum 4.

Although the above preferred embodiments employ the surface-emitting lasers as the semiconductor laser array, end-emitting lasers may be used instead. Further, although the semiconductor lasers and the LED elements are used as the arrayed light emitting portions in the above preferred embodiments, superluminescent diode elements, electroluminescent elements, fluorescent emitting elements, the combination of illuminant and liquid-crystal shutter, and the combination of illuminant and AO element or EO element may be used instead.

(EXAMPLE)

An example of design values of the semiconductor laser array 1 shown in FIG. 2 is as follows:

$L_1$=35 mm $L_2$=2 mm $L_3$=30 mm $g_1$=$g_2$=50 mm d=3 to 5 mm

The number of the image writing light emitting portions 15 in one line: 16 to 32

Aperture size of each of the light emitting portions 15 and 16: 5 μm

An example of design values of the semiconductor laser array 1 shown in FIG. 5 is as follows:

L=300 mm g=20 to 100 μm d=3 to 5 mm

Aperture size of each of the light emitting portions 15 and 16: 5 μm

The following modifications may be made according to the present invention.

(1) The photosensitive drum is advanced or retracted according to the spot size of the detecting light beam.

(2) The light detecting portion for detecting the detecting light beam is formed over the circumference of a nonimage forming region of the photosensitive drum or over a given length of the outer circumference. The given length is determined in consideration of a response speed of the like of the light detecting portion.

(3) The optical path of the detecting light beam is changed by a mirror or the like according to layout.

(4) The image writing light beam is utilized as the detecting light beam.

(5) The forward and backward movements of the focusing optical system are controlled so as to adjust the beam size in either the horizontal scanning direction or in the vertical scanning direction, or the beam sizes in both the directions.

As described above, according to the optical beam recording device of the present invention, the detecting light beam emitted from the detecting light emitting portion is detected to control shift of a focal position of each image writing light beam. Accordingly, the beam size of each image writing light beam can be controlled with high accuracy without using any light detecting portion having high-speed response performance, thereby performing high-definition image recording with prevention of degradation in image quality.

The following effects according to the above preferred embodiments can be obtained.

(1) Since the detecting light beams are detected on the opposite sides of the photosensitive drum, the beam size of the light beam from each image writing light emitting portion can be controlled with high accuracy without increasing the number of photodetectors and inviting the complication of configuration.

(2) In the case of using reflected light from the photosensitive drum, whether or not a focal position falls on the photosensitive drum can be accurately detected.

(3) Since deflected light based on a polygon mirror or the like is not used, the response speed of each photodetector becomes insignificant.

(4) In the case that all the components of the focusing optical system are formed by spherical lenses, a focal position in a plane perpendicular to the optical axis can be corrected only by detecting the beam size in one axial direction in this plane.

(5) Also in the case that the focusing optical system is formed by a spherical lens or lenses and an anamorphic lens having a refracting power in only one direction in a plane perpendicular to the optical axis, the beam size can be accurately adjusted only by detecting shifts of a focal position in two directions. Also in the case that zoom ratios in the horizontal scanning direction and the vertical scanning direction are changed, a similar effect can be obtained.

(6) In the case that the beam size in the horizontal scanning direction is different from that in the vertical scanning direction, a focal position can be corrected generally by only controlling the smaller beam size sensitive to shift of the focal position.

(7) In the case that the focusing optical system rather than the light source is moved, it is possible to suppress distortion of an image plane due to inclination or twist possibly caused by the movement of the light source.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An optical beam recording device for performing image recording by focusing a plurality of light beams modulated according to an image signal through a focusing optical system, comprising:

a light source having a plurality of arrayed light emitting portions for emitting said plurality of light beams and a detecting light beam;

a photosensitive member receiving the plurality of light beams to form an electrostatic latent image on a surface of the photosensitive member;

light detecting means located at a given position for detecting the detecting light beam; and control means for controlling a focused condition of said plurality of light beams on said photosensitive member according to a result of detection of said detecting light beam by said light detecting means.

2. An optical beam recording device according to claim 1, wherein said light source has a plurality of arrayed image writing light emitting portions for emitting a plurality of image writing light beams and a detecting light emitting portion located adjacent to said image writing light emitting portions for emitting said detecting light beam to be focused through said focusing optical system to said given position.

3. An optical beam recording device according to claim 2, wherein:

said light source has a recording region in which said arrayed image writing light emitting portions are arranged and first and second detecting regions in which first and second detecting light emitting portions formed as said detecting light emitting portion in spaced relationship from each other are respectively arranged;

said light detecting means has first and second light detecting portions for respectively detecting first and second detecting light beams respectively emitted from said first and second detecting light emitting portions; and said control means controls a focused condition of said plurality of image writing light beams on said photosensitive member according to a result of detection of said first and second detecting light beams.

4. An optical beam recording device according to claim 3, wherein said first and second light detecting portions of said light detecting means are located in nonimage forming regions formed at opposite side edges of said photosensitive member.

5. An optical beam recording device according to claim 3, wherein said first and second light detecting portions of said light detecting means are located on opposite sides of said photosensitive member in adjacent relationship thereto.

6. An optical beam recording device according to claim 3, wherein said first and second detecting regions of said light source are formed on opposite sides of said recording region of said light source.

7. An optical beam recording device according to claim 6, wherein said first and second detecting light emitting portions are respectively formed in said first and second detecting regions so that a straight line connecting said first and second detecting light emitting portions intersect a horizontal scanning line.

8. An optical beam recording device according to claim 1, wherein said given position of said light detecting means is a position where reflected light of said detecting light beam from said photosensitive member is detected by said light detecting means.

9. An optical beam recording device according to claim 1, wherein said light detecting means detects a beam size of said detecting light beam along one segment passing through said detecting light beam.

10. An optical beam recording device according to claim 1, wherein said light detecting means detects a beam size of said detecting light beam along two perpendicular segments passing through said detecting light beam.

11. An optical beam recording device according to claim 1, further comprising optical path changing means for changing an optical path of said detecting light beam;

said given position of said light detecting means is a position lying on said optical path changed by said optical path changing means.

12. An optical beam recording device according to claim 1, wherein said light detecting means is located in one of a convergent region where said detecting light beam is converged toward a focal point and a divergent region where said detecting light beam is diverged from said focal point.

13. An optical beam recording device according to claim 1, wherein said given position of said light detecting means is a position adjacent to said photosensitive member.

14. An optical beam recording device according to claim 1, wherein said control means comprises light source moving means for advancing and retracting said light source along an optical axis of each of said plurality of light beams.

15. An optical beam recording device according to claim 1, wherein said control means comprises optical system moving means for advancing and retracting said focusing optical system along an optical axis of each of said plurality of light beams.

16. An optical beam recording device according to claim 1, wherein said control means comprises photosensitive member moving means for advancing and retracting said photosensitive member along an optical axis of each of said plurality of light beams.

* * * * *